(12) United States Patent
Luo et al.

(10) Patent No.: US 11,509,238 B2
(45) Date of Patent: Nov. 22, 2022

(54) AC/DC POWER SUPPLY, RECTIFIER CIRCUIT AND CONTROL METHOD

(71) Applicant: Silergy Semiconductor Technology (Hangzhou) LTD, Hangzhou (CN)

(72) Inventors: Nan Luo, Hangzhou (CN); Qiukai Huang, Hangzhou (CN); Jian Deng, Hangzhou (CN); Zhaofeng Wang, Hangzhou (CN); Jialiang Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/202,514

(22) Filed: Mar. 16, 2021

(65) Prior Publication Data

US 2021/0305909 A1    Sep. 30, 2021

(30) Foreign Application Priority Data

Mar. 24, 2020   (CN) .......................... 202010214808.5

(51) Int. Cl.
*H02M 7/06*      (2006.01)
*H02M 1/14*      (2006.01)
*H02M 1/15*      (2006.01)

(52) U.S. Cl.
CPC ............. *H02M 7/066* (2013.01); *H02M 1/14* (2013.01); *H02M 1/15* (2013.01); *H02M 7/06* (2013.01)

(58) Field of Classification Search
CPC ...... H02M 1/0067; H02M 1/007; H02M 1/14; H02M 1/15; H02M 7/06; H02M 7/066
See application file for complete search history.

(56) References Cited

U.S. PATENT DOCUMENTS

| | | |
|---|---|---|
| 7,227,277 B2 | 6/2007 | Chapman et al. |
| 7,256,568 B2 | 8/2007 | Lam et al. |
| 8,310,846 B2 | 11/2012 | Piazzesi |
| 8,853,888 B2 | 10/2014 | Khaligh |
| 9,130,460 B2 | 9/2015 | Sun et al. |
| 9,257,916 B2 | 2/2016 | Cheng et al. |
| 9,543,822 B2 | 1/2017 | Hang et al. |
| 9,559,591 B2 | 1/2017 | Hang et al. |
| 2007/0052397 A1 | 3/2007 | Thompson et al. |
| 2008/0231115 A1 | 9/2008 | Cho et al. |
| 2008/0258688 A1 | 10/2008 | Hussain et al. |
| 2012/0153729 A1 | 6/2012 | Song et al. |
| 2013/0063180 A1 | 3/2013 | Sun et al. |
| 2015/0078045 A1 | 3/2015 | Zhang et al. |
| 2016/0211745 A1 | 7/2016 | Hang et al. |
| 2017/0063238 A1 | 3/2017 | Hang et al. |
| 2017/0279279 A1 | 9/2017 | Shimada et al. |
| 2017/0288585 A1* | 10/2017 | Pant .................. H02P 6/085 |
| 2018/0198361 A1 | 7/2018 | Seong et al. |
| 2019/0260303 A1* | 8/2019 | Chen ................ H02M 1/4266 |

\* cited by examiner

*Primary Examiner* — Gary L Laxton

(57) ABSTRACT

A rectifier circuit applied in an AC/AC power supply, the rectifier circuit including: a filter circuit configured to receive a DC pulsating voltage, and to generate a supply voltage, where the supply voltage follows the DC pulsating voltage during a first time interval of an operation cycle; and where during a second time interval of the operation cycle, a value of the supply voltage is greater than the value of the supply voltage at an end of the first time interval, in order to reduce a size of the filter circuit.

17 Claims, 5 Drawing Sheets

US 11,509,238 B2

AC/DC POWER SUPPLY, RECTIFIER CIRCUIT AND CONTROL METHOD

RELATED APPLICATIONS

This application claims the benefit of Chinese Patent Application No. 202010214808.5, filed on Mar. 24, 2020, which is incorporated herein by reference in its entirety.

FIELD OF THE INVENTION

The present invention generally relates to the field of power electronics, and more particularly to AC/DC power supplies, rectifier circuits, and associated control methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
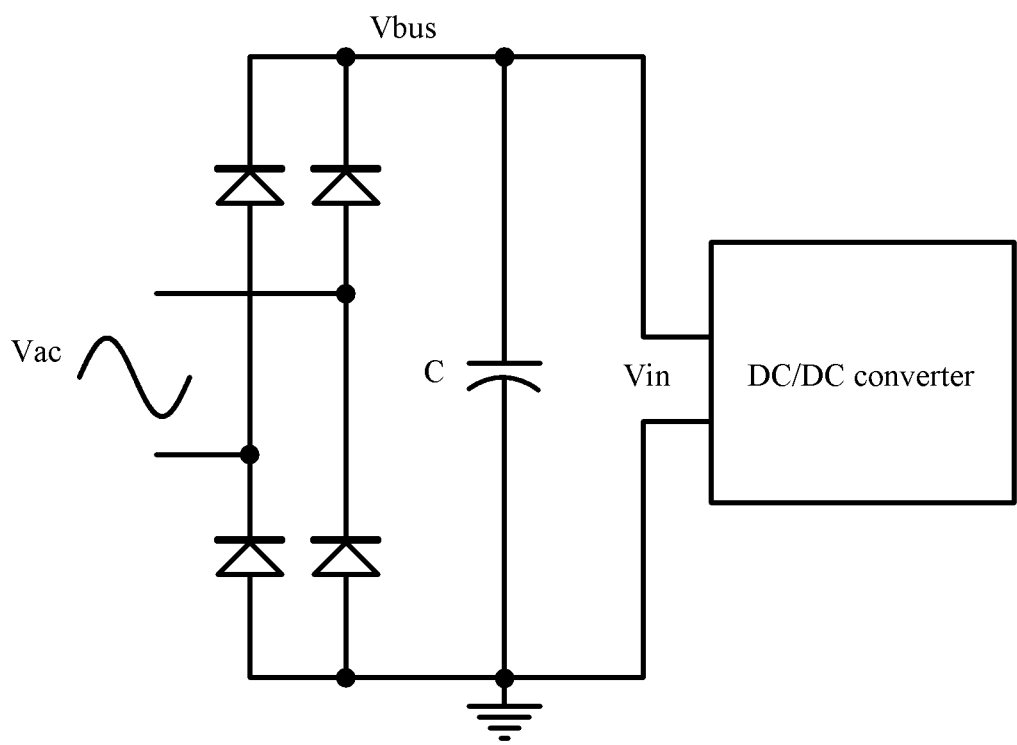
FIG. 1 is a schematic block diagram of an AC/DC power supply.

At present, a power supply with two-stage conversion circuit may generally be used in AC/DC applications without power factor correction (PFC) requirements. In FIG. 1, shown is a schematic block diagram of an AC/DC power supply. For example, the previous stage of the AC/DC power supply is a rectifier circuit, including a rectifier bridge, which can rectify AC input voltage Vac into DC pulsating voltage Vbus. Here, DC pulsating voltage Vbus is an absolute value of AC input voltage Vac. An output terminal of the rectifier bridge can connect in parallel with capacitor C, in order to generate supply voltage Vin. The subsequent stage of the AC/DC power supply can be a DC/DC converter used to convert supply voltage Vin into an required voltage.

Figure 2:
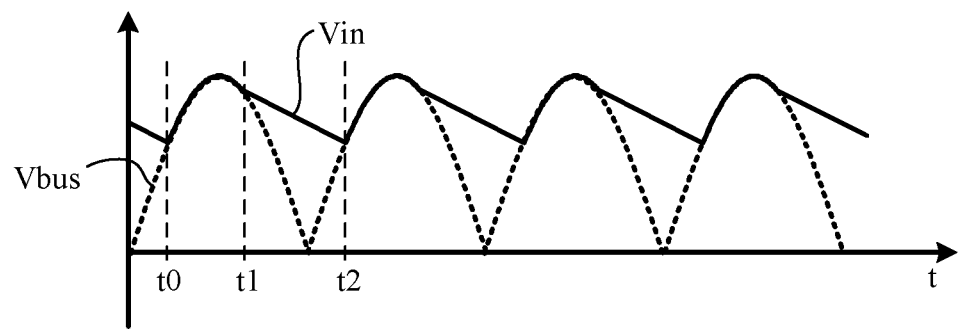
FIG. 2 is a waveform diagram of an example operation of a rectifier circuit.

Referring now to FIG. 2, shown is a waveform diagram of example operation of a rectifier circuit. At time t0, DC pulsating voltage Vbus rises to the voltage across capacitor C (e.g., supply voltage Vin). During time period t0-t1, the rectifier bridge is turned on, supply voltage Vin changes with DC pulsating voltage Vbus, and AC input voltage Vac charges capacitor C while providing energy to the subsequent stage of the AC/DC power supply. At time t1, DC pulsating voltage Vbus drops to be equal to supply voltage Vin. During time period t1-t2, the rectifier bridge is turned off, and capacitor C is discharged to provide energy to the subsequent stage, such that supply voltage Vin decreases linearly and equals DC pulsating voltage Vbus at time t2. After that, the rectifier bridge can be turned on again, and the above operation process repeated.

In the above operation process, AC input voltage Vac may only provide energy for the subsequent stage during time period t0-t1. In this way, supply voltage Vin may need to be within a certain range to ensure the normal operation of the DC/DC converter. On the one hand, in order to meet the low input voltage under full load conditions, a capacitor with a larger capacitance may be required. On the other hand, in order to meet requirements of a withstand voltage under the high input voltage, the capacitor with a higher withstand voltage may be required. The capacitor with the high capacitance and high withstand voltage can result in a larger volume of the capacitor, ultimately leading to a larger volume of the AC/DC power supply, and reduction in the power density of the AC/DC power supply.

Figure 3:
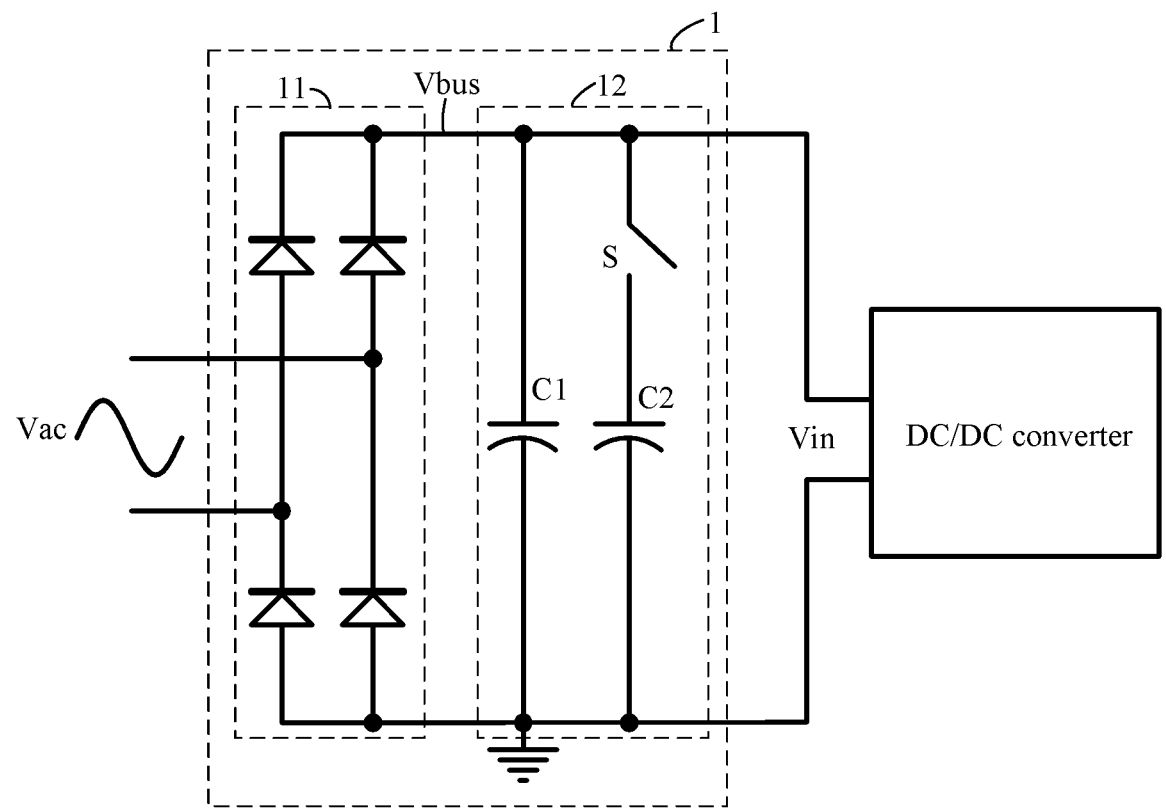
FIG. 3 is schematic block diagram of an example AC/DC power supply, in accordance with embodiments of the present invention.

Referring now to FIG. 3, shown is a schematic block diagram of an example AC/DC power supply, in accordance with embodiments of the present invention. This example AC/DC power supply can include a front stage circuit that is rectifier circuit 1, and a subsequent stage circuit that is DC/DC converter 2. The rectifier circuit 1 can include rectifier unit 11 and filter circuit 12. Rectifier unit 11 can receive AC input voltage Vac, and rectify it into DC pulsating voltage Vbus. Here, DC pulsating voltage Vbus is an absolute value of AC input voltage Vac. In one example, rectifier unit 11 can include four diodes performing a function of bridge rectification. It can be understood that the four diodes can also be partially or completely replaced by power switches. Rectifier unit 11 may also include other circuits with rectification functions, such as a bridgeless LLC circuit.

Filter circuit 12 can connect to an output terminal of rectifier unit 11 to receive DC pulsating voltage Vbus, and generate supply voltage Vin to provide to the DC/DC converter. During a first time interval of an operation cycle, the operation waveform of supply voltage Vin may follow DC pulsating voltage Vbus. During a second time interval, the value of supply voltage Vin may be greater than the value of supply voltage Vin at the end of the first time interval, thereby reducing the size of filter circuit 12. Further, in the second time interval, supply voltage Vin can be less than or equal to the peak value of the minimum DC pulsating voltage Vbus.

In one example, filter circuit 12 can include two operation modes. In a first part of the first time interval, filter circuit 12 can operate in a first operation mode. In a second part of the first time interval and during the second time interval, filter circuit 12 can operate in the second operation mode. In the first operation mode, filter circuit 12 may have a first capacitance value, and in the second operation mode, filter circuit 12 may have a second capacitance value. Here for example, the second capacitance value is greater than the first capacitance value. In this example, the first part of the first time interval can begin when DC pulsating voltage Vbus rises to threshold Vth2, and may end when DC pulsating voltage Vbus drops to threshold Vth1. The second part of the first time interval can begin when DC pulsating voltage Vbus rises to supply voltage Vin, and may end when DC pulsating voltage Vbus reaches threshold Vth2. The second time interval can begin when DC pulsating voltage Vbus drops to threshold Vth1, and may end when DC pulsating voltage Vbus rises to supply voltage Vin.

For example, threshold Vth1 can be set according to the minimum operating voltage of the subsequent stage circuit of the AC/DC power supply, and threshold Vth2 can be greater than threshold Vth1 but not greater than the peak value of the minimum DC pulsating voltage Vbus. In one example, filter circuit 12 can include capacitors C1 and C2, and the capacitance of capacitor C2 can be much larger than the capacitance of capacitor C1. Capacitor C1 can connect in parallel with an input terminal of filter circuit 12, and capacitor C2 may selectively be connected in parallel with capacitor C1. That is, capacitor C1 can be separately connected in parallel to the input terminal of filter circuit 12 in the first operation mode. In the second operation mode, capacitors C1 and C2 can both connect in parallel to the input terminal of filter circuit 12.

In this example, filter circuit 12 can also include switch S connected in series with capacitor C2, in order to selectively connect capacitor C2 in parallel to the input terminal of filter circuit 12. Switch S can be controlled to be turned off in the first operation mode, and controlled to be turned on in the second operation mode. It should be understood that any suitable circuitry that can implement such filter functionality can be utilized in certain. For example, the first capacitor can also be connected in series with a switch that can be turned on in the first operation mode, and turned off or on in the second operation mode.

Figure 4:
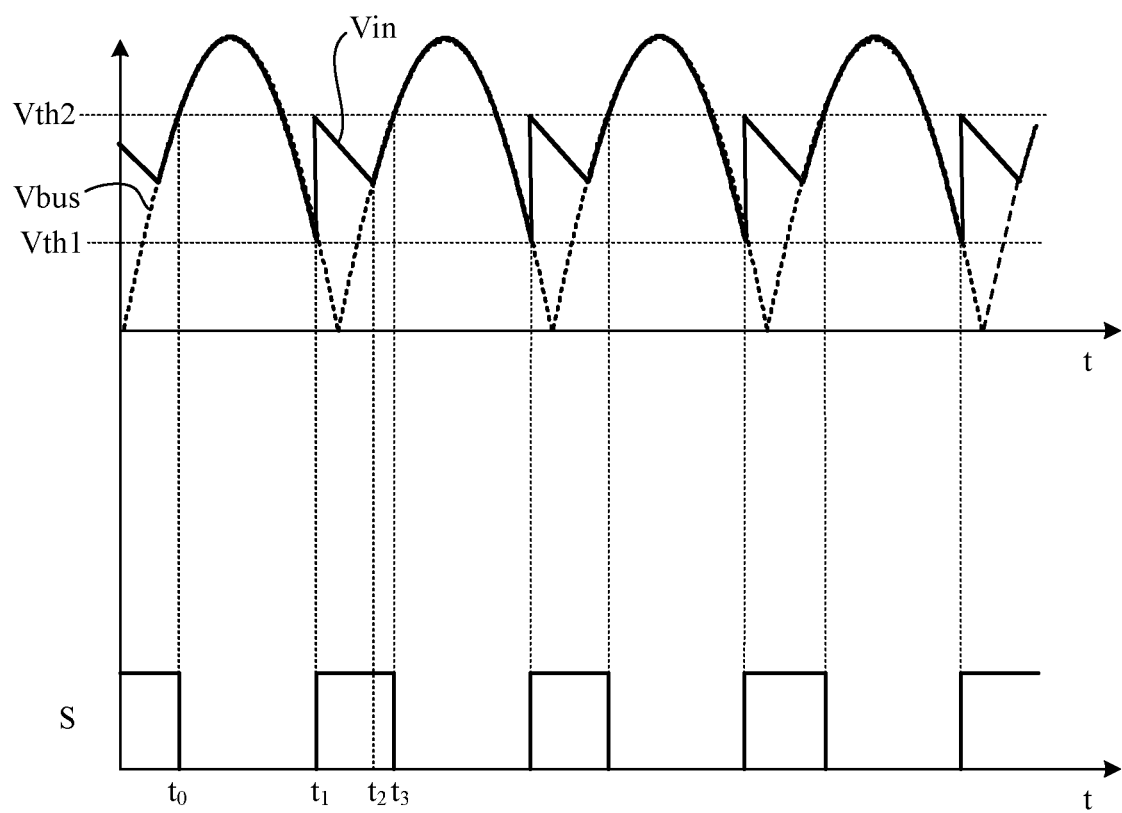
FIG. 4 is a waveform diagram of example operation of a rectifier circuit, in accordance with embodiments of the present invention.

Referring now to FIG. 4, shown is a waveform diagram of example operation of a rectifier circuit, in accordance with embodiments of the present invention. In this particular example, DC pulsating voltage Vbus can rise to threshold Vth2 at time t0, after which the filter circuit can begin to enter the first operation mode. In the first operation mode, switch S can be controlled to be turned off; that is, the input terminal of filter circuit 12 may only be connected in parallel with capacitor C1. During time period t0-t1, that is, during the first part of the first time interval, since the capacitance of capacitor C1 is relatively small, supply voltage Vin can follow the DC pulsating voltage Vbus. During this period, capacitor C1 and AC input voltage Vac may together provide energy to the subsequent stage circuit of the AC/DC power supply. DC pulsating voltage Vbus can rise to a peak value and then begins to fall. At time t1, DC pulsating voltage Vbus can fall to threshold Vth1, thus ending the first part of the first time interval. After that, filter circuit 12 may enter the second operation mode.

In the second operation mode, switch S can be controlled to be turned on to connect capacitor C2 to the input terminal of filter circuit 12 in parallel. Since the capacitance of capacitor C2 is much larger than the capacitance of capacitor C1, supply voltage Vin can instantly rise to approximately be equal to the voltage across capacitor C2 (e.g., threshold Vth2). During time period t1-t2 (e.g., the second time interval), since supply voltage Vin is greater than DC pulsating voltage Vbus, rectifier unit 11 can be turned off, such that capacitors C1 and C2 together provide energy for the subsequent stage circuit of the AC/DC power supply, and supply voltage Vin also linearly decreases as the capacitors discharge. During this period, DC pulsating voltage Vbus may drop to zero and then rise. At time t2, DC pulsating voltage Vbus can rise to be equal to supply voltage Vin, thus ending the second time interval. After that, rectifier unit 11 can be turned on.

During time period t2-t3, that is, the second part of the first time interval, filter circuit 12 may remain in the second operation mode. During this period, supply voltage Vin can follow the DC pulsating voltage Vbus. On the one hand, AC input voltage Vac can charge capacitors C1 and C2. On the other hand, AC input voltage Vac may provide energy to the subsequent stage circuit of the AC/DC power supply. DC pulsating voltage Vbus can continue to rise and can be greater than threshold Vth2 at time t3, thus ending the second part of the first time interval. After that, the filter circuit may enter the first operation mode, and switch S can be controlled to turn off. At this time, the voltage across capacitor C2 is threshold Vth2, that is, the maximum voltage across capacitor C2 is threshold Vth2.

In this particular example, AC input voltage Vac may provide energy for the subsequent stage circuit of the AC/DC power supply during first part t0-t1 and second part t2-t3 of the first time interval. That is, the time for AC input voltage Vac supplying energy for the subsequent stage circuit can be substantially prolonged, as compared to example of FIG. 2, such that the capacitors (e.g., capacitors C1 and C2) in the filter circuit do not need to have a relatively large capacitance, and the subsequent circuit can operate normally, thus reducing the volume of the filter circuit. Further, since capacitor C in the example of FIG. 2 has been connected in parallel to the output terminal of the rectifier circuit, the withstand voltage of the capacitor is equal to the peak value of the maximum DC pulsating voltage. However, in this particular example, the withstand voltage of capacitor C2 is threshold Vth2, that is, the peak value of the smallest DC pulsating voltage.

It should be understood that the maximum DC pulsating voltage and the minimum DC pulsating voltage refer to the AC input voltages with different voltage levels received by the rectifier circuit. Therefore, the DC pulsating voltage may have different voltage ranges, such as in order to meet different requirements. For example, the AC input voltage received by the AC/DC power supply can be between 110V and 220V. Therefore in this example, the peak value of the maximum DC pulsating voltage is 220V, and the peak value of the minimum DC pulsating voltage is 110V. In some examples, the required maximum voltage value of the capacitor is 220V. However, in particular embodiments, the maximum voltage value of capacitor C2 is 110V, thereby reducing the volume of capacitor C2. In addition, although the withstand voltage of capacitor C1 is still 220V, its volume remains relatively small due to its relatively small capacitance.

Figure 5:
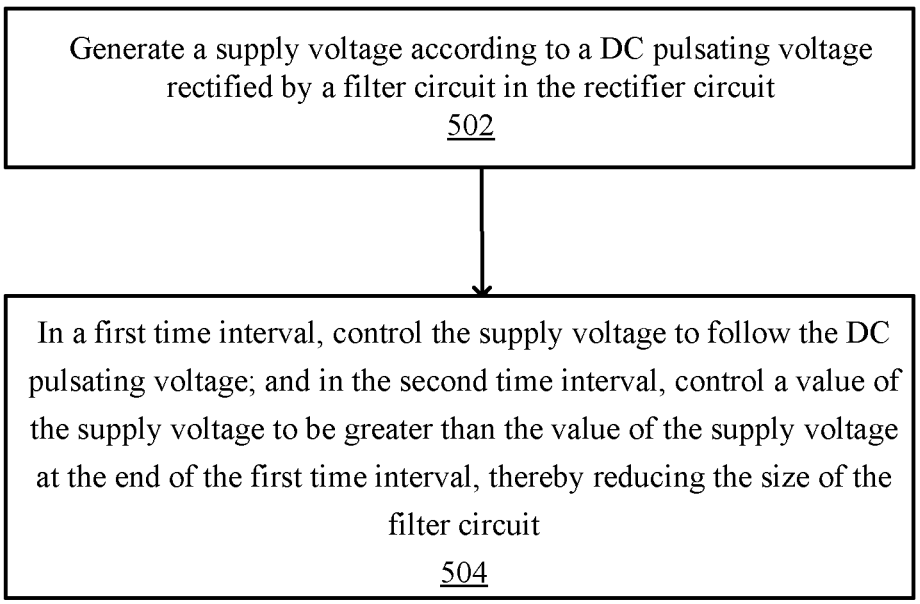
FIG. 5 is a flow diagram of an example method of controlling a rectifier circuit, in accordance with embodiments of the present invention.

Referring now to FIG. 5, shown is a flow diagram of an example method of controlling a rectifier circuit, in accordance with embodiments of the present invention. This example control method can include generating a supply voltage according to a DC pulsating voltage obtained after rectified at 502. At 504, during a first time interval of an operation cycle, the supply voltage can be controlled to follow a DC pulsating voltage by a filter circuit, and during a second time interval, a value of the supply voltage can be controlled to be greater than the value of the supply voltage at the end of the first time interval by the filter circuit, thereby reducing the size of a filter circuit.

Further, in a first part of the first time interval, the filter circuit can generate a first capacitance value to receive the DC pulsating voltage. In the second time interval and during a second part of the first time interval, the filter circuit may generate a second capacitance value to receive the DC pulsating voltage, where the second capacitance value is greater than the first capacitance value. In this example, the first part of the first time interval can begin when DC pulsating voltage Vbus rises to threshold Vth2, and end when DC pulsating voltage Vbus drops to threshold Vth1. The second part of the first time interval can begin when DC pulsating voltage Vbus rises to supply voltage Vin, and end when DC pulsating voltage Vbus reaches threshold Vth2. The second time interval can begin when DC pulsating voltage Vbus drops to threshold Vth1, and may end when DC pulsating voltage Vbus rises to supply voltage Vin. Here, threshold Vth1 can be set according to the minimum operating voltage of the subsequent circuit of the AC/DC power supply, and threshold Vth2 may be greater than threshold Vth1 but not greater than the peak value of the minimum DC pulsating voltage Vbus.

In particular embodiments, the supply voltage generated by the filter circuit in the rectifier circuit may follow the DC pulsating voltage received by the filter circuit in the first time interval. In addition, in the second time interval, the value of the supply voltage can be greater than the value of the supply voltage at the end time of the first time interval, thereby reducing the volume of the filter circuit and the rectifier circuit, and also increasing the power density of the AC/DC power supply.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A rectifier circuit applied in an AC/AC AC/DC power supply, the rectifier circuit comprising:
   a) a filter circuit configured to receive a DC pulsating voltage, and to generate a supply voltage, wherein the supply voltage follows the DC pulsating voltage during a first time interval of an operation cycle;
   b) wherein during a second time interval of the operation cycle, a second value of the supply voltage is greater than a first value of the supply voltage at an end of the first time interval, in order to reduce a size of the filter circuit; and
   c) wherein the filter circuit comprises a first capacitor coupled in parallel with an input terminal of the filter circuit, and a second capacitor selectively coupled in parallel with the input terminal of the filter circuit, wherein a capacitance value of the second capacitor is greater than a capacitance value of the first capacitor, and the second capacitor is disconnected from the parallel connection with the first capacitor in a first part of the first time interval.

2. The rectifier circuit of claim 1, wherein in the second time interval, the second value of the supply voltage is less than or equal to a peak value of a minimum DC pulsating voltage.

3. The rectifier circuit of claim 1, wherein:
   a) in a first part of the first time interval, the filter circuit operates in a first operation mode; and
   b) in a second part of the first time interval and during the second time interval, the filter circuit operates in a second operation mode.

4. The rectifier circuit of claim 3, wherein:
   a) in the first operation mode, the filter circuit has a first capacitance value; and
   b) in the second time interval, the filter circuit has a second capacitance value that is greater than the first capacitance value.

5. The rectifier circuit of claim 1, wherein the DC pulsating voltage provides power to a subsequent circuit of the AC/DC power supply during the first time interval.

6. The rectifier circuit of claim 3, wherein:
   a) the first part of the first time interval starts when the DC pulsating voltage rises to a second threshold and ends when the DC pulsating voltage drops to a first threshold; and
   b) the second part of the first time interval starts when the DC pulsating voltage rises to the supply voltage and ends when the DC pulsating voltage reaches the second threshold.

7. The rectifier circuit of claim 6, wherein:
   a) the second time interval starts when the DC pulsating voltage drops to the first threshold and ends when the DC pulsating voltage rises to the supply voltage; and
   b) the second threshold is greater than the first threshold, and is less than or equal to a peak value of a minimum DC pulsating voltage.

8. The rectifier circuit of claim 1, wherein in a second part of the first time interval and the second time interval, the second capacitor is coupled in parallel with the first capacitor.

9. The rectifier circuit of claim 1, wherein the filter circuit further comprises a first switch coupled in series with the second capacitor, the first switch being configured to control the second capacitor to selectively couple in parallel with the input terminal of the filter circuit.

10. The rectifier circuit of claim 9, wherein when the DC pulsating voltage falls to the first threshold, the first switch is turned on to control the second capacitor to be coupled in parallel with the first capacitor.

11. The rectifier circuit of claim 9, wherein when the DC pulsating voltage rises to the second threshold, the first switch is turned off to control the second capacitor to disconnected from the parallel connection with the first capacitor.

12. The rectifier circuit of claim 1, further comprising a rectifier unit configured to receive an alternating current voltage to generate the DC pulsating voltage.

13. The AC/DC power supply and the rectifier circuit of claim 1, and further comprising a DC/DC converter configured to convert the supply voltage to generate a desired voltage in order to provide to a load.

14. The rectifier circuit of claim 1, wherein during the second time interval, the supply voltage increases to a peak value, and then falls to the DC pulsating voltage.

15. A method of controlling a rectifier circuit, the method comprising:
   a) generating a supply voltage according to a DC pulsating voltage rectified by a filter circuit in the rectifier circuit;
   b) during a first time interval of an operation cycle, controlling the supply voltage to follow the DC pulsating voltage;

c) during a second time interval, controlling a second value of the supply voltage to be greater than a first value of the supply voltage at an end of the first time interval, thereby reducing a size of the filter circuit;
d) wherein in a first part of the first time interval, the filter circuit generates a first capacitance value to receive the DC pulsating voltage; and
e) wherein in a second time interval and a second part of the first time interval, the filter circuit generates a second capacitance value to receive the DC pulsating voltage, and the second capacitance value is greater than the first capacitance value.

16. The method of claim 15, wherein:
a) a first part of the first time interval starts when the DC pulsating voltage rises to a second threshold and ends when the DC pulsating voltage drops to a first threshold;
b) a second part of the first time interval starts when the DC pulsating voltage rises to the supply voltage and ends when the DC pulsating voltage reaches the second threshold; and
c) the second time interval starts when the DC pulsating voltage drops to the first threshold and ends when the DC pulsating voltage rises to the supply voltage.

17. The method of claim 16, wherein the second threshold is greater than the first threshold, and is less than or equal to a peak value of a minimum DC pulsating voltage.

* * * * *